United States Patent [19]

Matsuura et al.

[11] Patent Number: 4,485,338
[45] Date of Patent: Nov. 27, 1984

[54] METHOD AND APPARATUS FOR SENSING CURRENT POSITION IN POSITION CONTROL SYSTEM

[75] Inventors: Hitoshi Matsuura; Etsuo Yamazaki, both of Hachioji; Hiroshi Sakurai, Hino, all of Japan

[73] Assignee: Fanuc Ltd, Tokyo, Japan

[21] Appl. No.: 442,424

[22] Filed: Nov. 17, 1982

[30] Foreign Application Priority Data

Nov. 25, 1981 [JP] Japan .............................. 56-188596

[51] Int. Cl.³ ........................................... G06F 15/16
[52] U.S. Cl. .................................... 318/569; 318/600
[58] Field of Search ............... 318/568, 569, 603, 625, 318/578, 602, 632; 364/170

[56] References Cited

U.S. PATENT DOCUMENTS

4,074,177  2/1984  Olig .................................... 318/602

Primary Examiner—J. V. Truhe
Assistant Examiner—Saul M. Bergmann
Attorney, Agent, or Firm—Staas & Halsey

[57] ABSTRACT

A method and apparatus for sensing the current position of a movable element in a position control system which includes first and second control devices each having a command pulse generating means and error storage means for computing and storing an error between a number of command pulses and a number of feedback pulses indicative of an amount of motor movement. The position control system also includes a speed control circuit for driving and controlling the motor on the basis of the error in the storage means, and a switching circuit for selectively connecting the first and second control devices to the speed control circuit, the current position of the movable element being sensed by one control device when the other control device is connected to the speed control circuit. The method includes steps of storing the errors which prevail in the respective storage means just prior to switching from the first control device to the second control device, returning the movable element to the position which prevailed just prior to the switching operation by supplying the speed control circuit with an offset voltage corresponding to an arithmetic difference found by subtracting the stored error from the error storage means of said second control device, from the error in the error storage means of the second control device after the switching operation when the movable element has stabilized, updating the data in a current position register of the first control device on the basis of an arithmetic difference found by subtracting the stored error from the error storage means of the first control device, from the data in the error storage means of the first control device while the motor controlled by the second control device, and revising the data in the error storage means of the first control device on the basis of the arithmetic difference.

6 Claims, 8 Drawing Figures

METHOD AND APPARATUS FOR SENSING CURRENT POSITION IN POSITION CONTROL SYSTEM

CROSS REFERENCES TO RELATED APPLICATIONS

This application is related to U.S. applications having Ser. Nos. 442,422 and 442,423 which are assigned to the assignee of the present invention.

BACKGROUND OF THE INVENTION

This invention relates to a method and apparatus for sensing current position in a position control system for controlling the position of a single servomotor by means of a plurality of control devices. More particularly, the invention relates to a method and apparatus for sensing current position in a position control system so improved as to eliminate a positional error when switching among a plurality of control devices to drive and control a servomotor.

A system is available in which a movable machine element driven by a single servomotor is positionally controlled by placing the servomotor alternatively under the control of a plurality of control devices. By way of example, when machining a single workpiece by a machine tool operated under numerical control, portions of the workpiece that involve complex programming because of the sophisticated shape thereof are subjected to tracer control machining by a tracer control device, whereas the portions of the workpiece that are simple in shape are subjected to ordinary numerically controlled machining by a numerical control device. Such a technique makes it possible to machine the workpiece into the desired shape.

In the above-described position control system, the servomotor of the machine tool is positionally controlled by both the numerical control device and tracer control device to machine the workpiece as desired. Accordingly, during the period that the numerical control device is connected to the servomotor to drive the same, no connection exists between the servomotor and the tracer control device. Conversely, during the period that there is a connection between the tracer control device and the servomotor to drive the motor, the numerical control device is severed from the motor.

The numerical control device and tracer control device each incorporate a current position register to keep track of the current position of the movable machine element driven by the servomotor. Since control of the movable machine element of the machine tool is effected on the basis of the data stored in these registers, it is necessary for the amount of servomotor rotation to be sensed and for the current position registers to be updated based upon such rotation. This is true even for the position register incorporated in the control device not connected to the servomotor during such rotation. To this end, a so-called follow-up control method is available wherein the data stored in the error register of a position control circuit, provided in each of the control devices, is read in order to update the current position register. Because of an offset voltage which develops in the position control circuit, however, a problem arises wherein the servomotor is caused to drift each time it is switched over from one control device to the other, such drift being accompanied by an error which accumulates in the current position registers.

SUMMARY OF THE INVENTION

Accordingly, an object of the present invention is to provide a method and apparatus for sensing current position in a position control system of the type in which a single servomotor is controlled by a plurality of control devices, which method and apparatus prevent an accumulation error caused by switching among the control devices.

Another object of the present invention is to provide a method and apparatus for sensing current position in a position control system, wherein it is possible to compensate for movement of a movable element owing to rotation of a servomotor when switching among a plurality of control devices each of which has a steady deviation, or drift, differing from the others.

Still another object of the present invention is to provide a method and apparatus for sensing current position in a position control system, in which it is possible to prevent the introduction of an error into a current position register when switching among control devices.

A further object of the present invention is to provide a method and apparatus for sensing current position in a position control system, in which it is possible to sense the current position of a movable element accurately even when switching among plural control devices.

A method and apparatus for sensing the current position of a movable element in a position control system which includes first and second control devices each having a command pulse generating device and an error storage device for computing and storing an error between a number of command pulses and a number of feedback pulses indicative of an amount of motor movement. The position control system also includes a speed control circuit for driving and controlling the motor on the basis of the error in the storage device and a circuit for selectively connecting the first and second control devices to the speed control circuit. The current position of the movable element being sensed by one control device when the other control device is connected to the speed control circuit. The method includes the steps of storing the errors which prevail in the respective storage devices just prior to switching from the first control device to the second control device, returning the movable element to the position which prevailed just prior to the switching operation by supplying the speed control circuit with an offset voltage corresponding to an arithmetic difference found by subtracting the stored error from the error storage device of said second control device, from the error in the error storage device of the second control device after the switching operation when the movable element has stabilized, updating the data in a current position register of the first control device on the basis of an arithmetic difference found by subtracting the stored error from the error storage device of the first control device, from the data in the error storage device of the first control device while the motor is controlled by the second control device, and revising the data in the error storage device of the first control device on the basis of the arithmetic difference.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3, including

FIG. 4, including

DESCRIPTION OF THE PREFERRED EMBODIMENT

Figure 1:
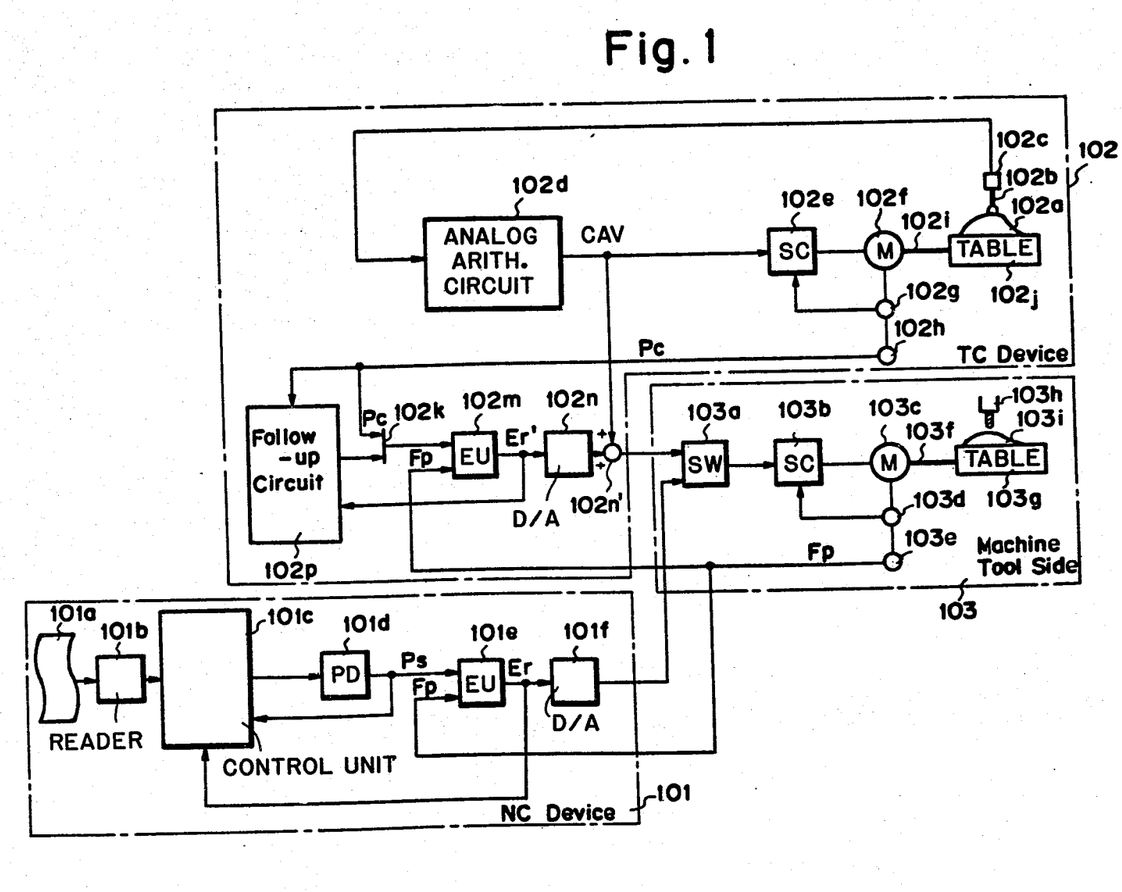
FIG. 1 is a block diagram of a numerical control system for driving a single servomotor by means of a tracer control device and numerical control device.

FIG. 1 is a block diagram illustrating an example of a position control system to which the present invention may be applied. In the illustrated example, the control system drives a servomotor by switching between a numerical control device (referred to hereinafter as an NC device) and a tracer control device (referred to hereinafter as a TC device), designated at 101 and 102, respectively. It should be noted that the NC device 101 and TC device 102 may be incorporated in the same casing or provided separately.

The NC device 101 includes a paper tape reader 101b for reading a paper tape 101a in which NC data has been punched, and a control unit 101c. The control unit 101c causes the tape reader 101b to read in the NC command data from the paper tape 101a, and decodes the read NC data, delivering, e.g., M, S and T function commands to the machine side through an included power sequence controller and a move command to a pulse distributor 101d upon initiating an arithmetic operation based on incremental values. The control unit 101c controls the updating of a current position register and a so-called remaining movement register, and stores the current position of a movable machine element, such as the table or tool of a machine tool, by executing follow-up control, described later, when the NC device 101 is severed from the servo system. The pulse distributor 101d executes well-known pulse distribution computations on the basis of incremental values, and generates distributed pulses (command pulses) $P_s$ at a frequency corresponding to a commanded speed. Numeral 101e denotes an error computing and storing unit which computes the difference (error) $E_r$ between the number of the input command pulses $P_s$ received from the pulse distributor 101d and the number of feedback pulses Ff generated by a pulse coder, as will be described below. A digital signal indicative of the error $E_r$ is applied to a DA converter 101f for converting the error $E_r$ into an analog voltage.

The block indicated at 103 represents the machine tool side. Provided on the machine side are a switching circuit 103a, a speed control circuit 103b, including a speed control unit, a servoamplifier unit and the like, which is switched between the NC device 101 and TC device 102 by the switching circuit 103a, a servomotor 103c, a tachometer 103d for generating a voltage indicative of the actual rotational speed of the servomotor 103c, a pulse coder 103e or like sensor for generating a feedback pulse Fp each time the servomotor rotates by a predetermined amount, a ball screw 103f rotated by the servomotor 103c, a table 103g transported by the ball screw 103f as the ball screw rotates, and a tool 103h for machining a workpiece 103i.

Let us assume that the NC device 101 is connected to the machine tool side 103 by the switching circuit 103a. When the control unit 101c issues a move command (incremental values along each axis), the pulse distributor 101d executes the pulse distribution computation on the basis of the incremental values and produces the distributed pulses $P_s$ which are applied to the error computing and storing unit 101e, the content whereof becomes non-zero as a result. Accordingly, the DA converter 101f provides a voltage corresponding to the content of the unit 101e, and the motor 103c is driven by the speed control circuit 103b so as to move the table 103g. When the motor 103c has rotated by a predetermined amount, the feedback pulse Fp is generated by the pulse coder 103e and is applied to the error calculating and storing unit 101e, with the latter storing the difference $E_r$ between the number of command pulses $P_s$ and the number of feedback pulses Fp. Thenceforth, servo control is executed in such a manner that the error $E_r$ approaches zero, with the table being transported to the target position as machining is carried out. It should be noted that the command pulses $P_s$ generated by the pulse distributor 101d are also applied to the control unit 101c as the foregoing processing is being executed, the pulses $P_s$ serving to update a current position register and a register which stores an amount of movement yet to be executed (see FIG. 5). When the remaining amount of movement assumes a value of zero, the control unit 101 internally generates a pulse distribution end signal.

The TC device 102 includes a model 102a, a stylus 102b in contact with the surface of the model 102a, a tracer head 102c, an analog arithmetic circuit 102d for producing signals indicative of tracer speed components along each axis, based on a displacement signal produced by the stylus 102b, a speed control circuit 102e, a motor 102f, a tachometer 102g for sensing the speed of the motor 102f, a pulse coder 102h or like sensor for generating a pulse $P_c$ each time the motor 102f rotates by a predetermined amount, a ball screw 102i rotated by the motor 102f, a table 102j transported by the ball screw 102d as it rotates, an OR gate 102k, and an error computing and storing unit 102m, comprising a reversible counter, for storing an error $E_{r'}$ between the number of pulses (command pulses) $P_c$ generated by the pulse coder 102h, and the number of feedback pulses Fp generated by the pulse coder 103e on the machine tool side 103. Also provided are a DA converter 102n for converting the error $E_{r'}$ into an analog voltage, a mixing circuit 102n', and a follow-up circuit 102p which executes follow-up control, to be described below.

Assume now that the TC device 102 is connected to the servo circuitry on the machine tool side 103 by the switching circuit 103a. When the table 102j is driven along the feed axis (Y-axis) by the motor 102f, the stylus 102b is displaced in accordance with the shape of the model 102a and produces a displacement signal which is fed into the analog arithmetic circuit 102d. As a result, the analog arithmetic circuit 102d produces a signal indicative of the tracer speed components along each axis, these corresponding to the stylus displacement. The signal, namely a commanded voltage CAV, causes the motor 102f to rotate further, and also rotates the motor 103c. When the motors 102f, 103c are rotated by a predetermined amount, the pulse coders 102h, 103e generate the command pulse $P_c$ and the feedback pulse Fp, which enter the error computing and storing unit 102m. The content of the unit 102m will be zero if the tracer and machine tool sides are in perfect synchronization, and non-zero when they are not. In order to maintain synchronization, therefore, the DA converter 102n produces a voltage commensurate with the error in unit 102m, and the mixing circuit 102n' combines this voltage with the commanded voltage CAV, whereby synchronization is achieved. In other words, servo control is executed in such a manner that the error voltage $E_r'$ produced by the DA converter approaches zero, with the table 103g being made to follow, i.e., to move in synchronization with, the table 102j. As the foregoing processing is being carried out, the command pulses $P_c$ from the pulse coder 102h are fed into the follow-up circuit 102p to update the content of a current position register incorporated within the circuit.

It is essential in an arrangement of this type that the NC device 101 store internally the current position of the machine tool, namely the table 103g, at all times even when tracer control is being carried out due to a connection between the TC device 102 and machine tool side 103. Likewise, it is necessary for the TC device 102 to constantly store the current position of the machine tool even when ordinary numerical control is being performed owing to a connection between the NC device 101 and the machine tool.

In view of the above requirement, a so-called follow-up control method has been proposed according to which the current position, stored within the NC device and TC device, is made to follow the current position of the machine tool element at all times, even though the machine tool 103 is not connected to both control devices at the same time. The follow-up control technique will now be described in brief for a case where the TC device 102 and machine tool 103 are interconnected, that is, where the NC device 101 is severed from the servo system.

When the motor 103c of the machine tool 103 is rotated under the control of the TC device 102, the pulse coder 103e produces the feedback pulses FP, each pulse being generated whenever the motor 103c rotates by a predetermined amount. The content of the error computing and storing unit 101e of NC device 101 is updated, i.e., decremented by one step in the case of forward rotation, each time a feedback pulse Fp is produced. If we assume that the content of the error computing and storing unit 101e initially is zero, then its content will be decremented to $-m_1$ by the generation of $m_1$-number of feedback pulses. The $-m_1$ data is read by the control unit 101c which performs the operation:

$$M + m_1 \to M \qquad (1)$$

with respect to the content M of a current position register located within the control unit 101c. In expression (1), the initial value of M is $M_o$. The control unit 102 also the sign of the read data from − to +, applying $+m_1$ to the pulse distributor 101d. The pulse distributor 101d responds to the $+m_1$ data by immediately performing a pulse distribution operation to produce the distributed pulses $P_s$. The distributed pulses $P_s$ enter the the error computing and storing unit 101e, the content thereof being updated by one step in the positive direction each time a pulse $P_s$ arrives. The error computing and storing unit 101e concurrently receives the feedback pulses Fp at its other input as long as the motor 103c is rotating. These pulses update the unit 101e by one step in the negative direction each time a pulse arrives. Accordingly, if we assume that the time at which the content $-m_1$ is read out of unit 101e is $t_1$, that the time at which the $m_1$-number of distributed pulses $P_s$ are generated is $t_2$, and that $m_2$-number of feedback pulses FP are generated between times $t_1$ and $t_2$, then the content of error computing and storing unit 101e at time $t_2$ will be $-m_2$.

When a number of distributed pulses $P_s$ equivalent to the commanded quantity $m_1$ have been produced, the control unit 101c generates internally a signal DEN indicative of the end of the pulse distribution operation. The control unit 101c responds to the signal DEN by once again reading the content ($-m_2$) of the unit 101e and performing the following addition:

$$M + m_2 \to M \qquad (1')$$

The control unit 101e also applies the data $m_2$ to the pulse distributor 101d. Owing to the arithmetic operation (1') above, the content M of the current position register becomes $M_o + m_1 + m_2$ (where $M_o$ is the initial value stored in the current position register prior to follow-up control). Thenceforth, each time the pulse distribution end signal DEN is generated, the control unit 101c reads the content $-m_i$ (i=1,2,3 ...) of the error computing and storing unit 101e, performs the addition:

$$M + m_i \to M (= \Sigma m_i + M_o) \qquad (1'')$$

and applies the numerical value $m_i$ to the pulse distributor 101d. From then on the aforesaid operations are repeated.

The foregoing is summarized by the following table:

| Time | t1 | t2 | t3 | — | ti | — | tj | tj + 1 |
|---|---|---|---|---|---|---|---|---|
| Number of pulses FP generated | $m_1$ | $m_2$ | $m_3$ | ... | $m_i$ | ... | $m_j$ | 0 |
| Number of pulses Ps generated | 0 | $m_1$ | $m_2$ | ... | $m_{i-1}$ | ... | $m_{j-1}$ | $m_j$ |
| Content of error register | $-m_1$ | $-m_2$ | $-m_3$ | ... | $-m_i$ | ... | $-m_j$ | 0 |

In the table shown above, t1 is the time at which the content of error computing and storing unit 101e is initially read, ti (i=2,3 ...) is the time at which the pulse distribution end signal DEN is generated, and $m_i$ represents the number of feedback pulses produced between time ti−1 and time ti. It will be appreciated from the table that the total number M of feedback pulses FP produced up to time tj+1 may be expressed by the following:

$$M = \sum_{i=1}^{j+1} m_i$$

which is precisely in agreement with the sum total exhibited by the error computing and storing unit 101e. The current position register within the control unit 101c will thus store the current position of the machine tool element at all times in accordance with the follow-up control method.

The foregoing dealt with a case where the NC device 101 is severed from the machine tool servo system. When the TC device 102 is disconnected, follow-up control is executed by the follow-up circuit 102p to store the current position of the machine tool element in the associated current position register at all times.

Figure 2:
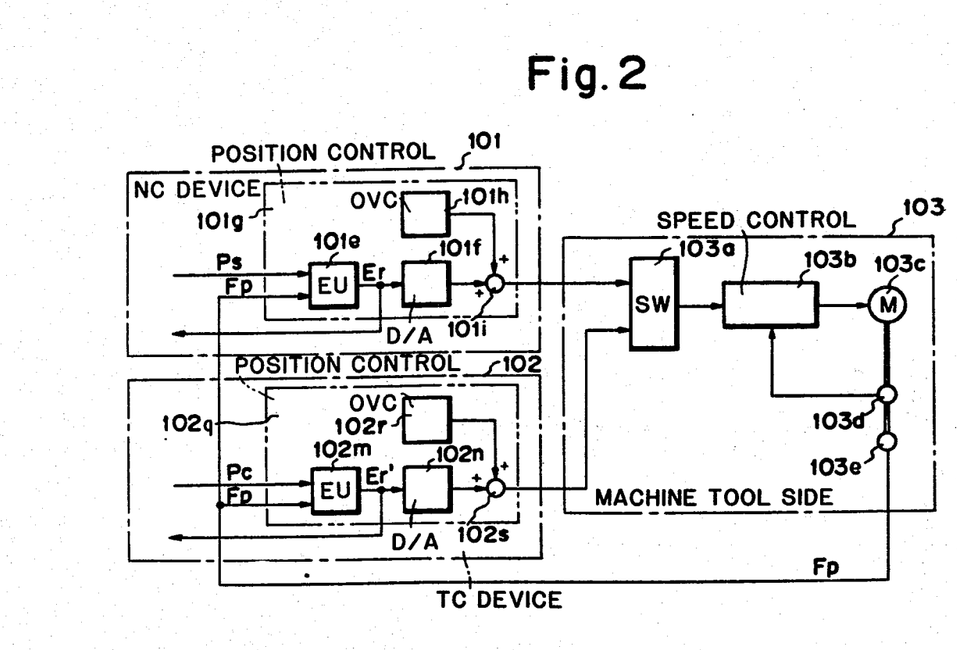
FIG. 2 is a block diagram showing, in greater detail, the principal portion of the block diagram of FIG. 1.

The principal portion of the system shown in FIG. 1 is illustrated in FIG. 2. Numerals 101g and 102q denote position control circuits, respectively, the former comprising the error computing and storing unit 101e, DA converter 101f, an offset voltage compensating circuit 101h, and a mixing circuit 101i, the comprising the error computing and storing unit 102m, DA converter 102n, an offset voltage compensating circuit 102r, and a mixing circuit 102s. In a system for driving a single motor by the two different control devices 101, 102, the switching circuit 103a selects the desired one of the position control circuits 101g, 102q of the respective control devices 101, 102 and connects it to the speed control circuit 103b so that a workpiece may be machined under tracer control on some occasions and under ordinary numerical control on others.

In a system of the above type, the position control circuits 101g, 102q and their peripheral circuits (such as the DA converters 101f, 102n) develop an offset voltage. When the position control circuit 101g of the NC device 101 is connected to the speed control circuit 103b to form a closed loop, therefore, the motor 103c will not stop even when the data (error) $E_r$ stored in the error computing and storing unit 101e becomes zero. Instead, the motor will come to rest when the error attains a value of $-l_1$. Likewise, when the position control circuit 102q of the TC device 102 is connected to the speed control circuit 103b to form a closed loop, the motor 103c will not stop even when the data (error) stored in the error computing and storing unit 102m becomes zero. Instead, the motor will come to rest when the error attains a value of $-l_2$. The errors (steady state deviations) $l_1$, $l_2$ differ because the two closed loops do not develop the same magnitude of drift, this being caused by a difference in the offset voltages prevailing in the position control circuits and the circuitry peripheral thereto. Accordingly, the motor 103c will be rotated by an amount corresponding to the difference from one drift value to the other whenever the machine tool is switched between the control devices. Furthermore, in the disconnected control device whose current position data is updated internally in accordance with the follow-up control technique, an error accumulates since the motor 103c is moved by an amount equivalent to $l_1$ or $l_2$ each time a switch is made, even when command pulses are not applied. Also, the content of the current position register in one of the control devices is updated in increments of $(l_1+l_2)$ with each switching operation, so that there is a change in current position indication in that control device.

Figure 3A:
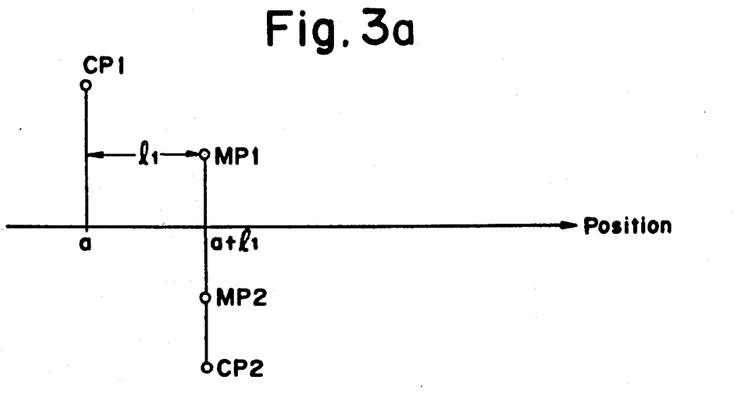
FIGS. 3(A)-3(C), is useful in describing the conventional method of sensing current position.

The foregoing phenomenon that occurs with the changeover from one control device to the other may be understood from FIG. 3, which illustrates movement along one axis only. $CP_1$ indicates the current position stored in the NC device, $MP_1$, $MP_2$ the actual machine element position, $CP_2$ the current position stored in the TC device, and $l_1$, $l_2$ the steady state deviations of the NC device and TC device, respectively. It should be noted that the machine element position is indicated by the two symbols $MP_1$, $MP_2$ for descriptive purposes only, i.e., that $MP_1$ and $MP_2$ designate exactly the same point along the axis of movement.

Figure 3B:
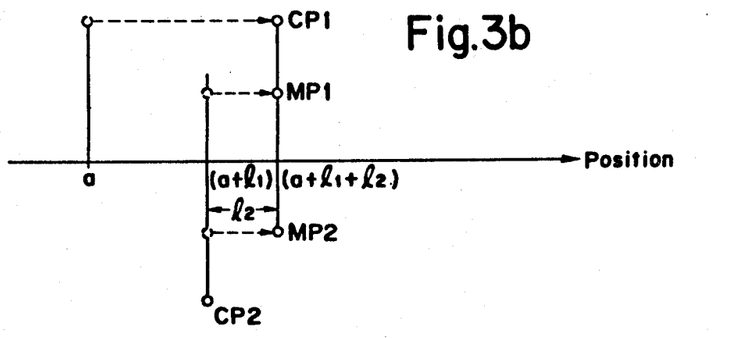

We will assume that the initial conditions are such that the NC device 101 is connected to the servo system of the machine tool 103, and that the motor is at rest. The initial situation is shown in of FIG. 3(A). Here the current position $CP_1$ stored in the current position register located in NC device 101 is indicated by a, whereas the machine element actually is stopped at the position $MP_1$, $MP_2$ $(a+l_1)$ displaced from a by the steady state deviation $l_1$. Furthermore, owing to follow-up control, the current position $CP_2$ stored in the current position register of the TC device 102 is indicated by $(a+l_1)$. Also, the data stored in the error computing and storing units 101e, 102m are $-l_1$ and 0, respectively. If the NC device 101 is now disconnected from the servo system of the machine tool 103 and the TC device is connected thereto instead, the machine element position $MP_2$ is shifted over a distance $+l_2$ owing to the changeover, since the steady deviation for the TC device 102 is $-l_2$. Thus the machine element stabilizes and comes to rest at the position $MP_2$ given by $(a+l_1+l_2)$, as shown in FIG. 3(B). Meanwhile, owing to the shift in machine element position equivalent to $l_2$, the pulse coder 103e generates $l_2$-number of feedback pulses Fp, whereby the contents of the error computing and storing units 101e, 102m attain values of $-(l_1+l_2)$ and $-l_2$, respectively. Thereafter, the content $CP_1$ of the current position register in NC device 101 eventually becomes $(a+l_1+l_2)$ owing to follow-up control, and the content of the error computing and storing unit 101e goes to zero. This corresponds to the condition shown in FIG. 3(B). In other words, by switching over from the NC device 101 to the TC device 102, the machine element position is shifted by $l_2$, and the content $CP_1$ of the current position register in the NC device 101 changes by $(l_1+l_2)$.

Figure 3C:
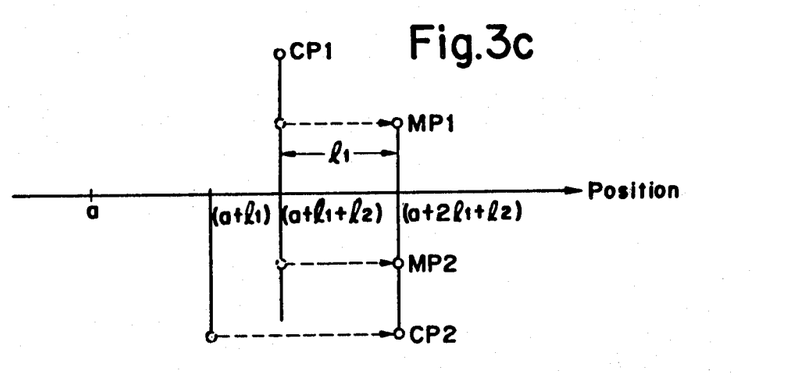

Under these conditions, when the machine tool 103 is switched back to the NC device 101 from the TC device 102 without the application of command pulses, the machine element position $MP_1$ is shifted over a distance $+l_1$ owing to the changeover, since the steady deviation for the NC device 101 is $-l_1$. Thus the machine element stabilizes and comes to rest at the position $MP_1$ given by $(a+2l_1+l_2)$, as shown in FIG. 3(C). Meanwhile, owing to the shift in machine element position equivalent to $l_1$, the pulse coder 103e (FIG. 1) generates $l_1$-number of feedback pulses Fp, whereby the contents of the error computing and storing units,101e, 102m attain values of $-(l_1+l_2)$ and $-l_1$, respectively. Thereafter, the content $CP_2$ of the current position register in TC device 102 becomes $(a+2l_1+l_2)$ owing to follow-up control, and the content of the error computing and storing unit 101m goes to zero. This corresponds to the condition shown in FIG. 3(C).

Accordingly, each time the machine tool is switched over from one control device to the other, the actual machine element position $MP_1$, $MP_2$ shifts by $l_1$ or $l_2$ in alternating fashion, while the current position registered in the control device which is disconnected shifts by $(l_1+l_2)$.

Thus, when two control devices have different steady state deviations (drift values), with the conventional method the motor is caused to rotate, thereby transporting the movable machine element, whenever the machine tool is switched between the control devices. Furthermore, in a case where the current position registered in the control devices is made to follow-up the machine element position by means of follow-up control, an error accumulates and the current position indication changes as the machine element position is moved with each switching operation, even when no command pulses are generated.

In view of the foregoing, the present invention seeks to effect an improvement in a system for driving a servomotor by means of different control devices. The improvement is such that no error accumulates because of a changeover from one control device to another, and such that there is no change in current position registered in the control devices owing to the switching operation and, hence, no change in the current position indication.

The gist of the present invention can be understood by better recognizing the flaw in the prior art. Specifically, when the control devices are switched, the output of the switching circuit 103a in FIGS. 1 and 2 changes because of the difference in drift value. The change in output causes the machine element to shift when the switching operation is made, so that the machine element position which prevailed prior to the switchover cannot be maintained.

The position control circuits generally are provided with the respective offset voltage compensating circuits 101h, 102r, as shown in FIG. 2, with the arrangement being such that each mixing circuit develops an output of $\epsilon v + OFS_v + OFS_c = C$ (a constant) when stabilization has been achieved and the machine tool is at rest. Here, $\epsilon v$ represents a voltage value for the error quantity which prevails at stabilization when the loop is closed, $OFS_v$ the offset voltage of the position control circuit and the circuitry peripheral thereto, and $OFS_c$ an offset compensation voltage which prevails at stabilization when the loop is closed. Because the offset voltages $OFS_v$ developed by the first and second control devices differ, so will the voltages $\epsilon v$ and the offset compensation voltages $OFS_c$ developed by the two control devices when the machine tool has stabilized and is at rest and the associated loops are closed.

If there is no change in the magnitude of the switching circuit output when the control devices are switched, then the machine tool element will not move. In other words, the machine tool element will not shift in position if the following condition holds when the switching operation is carried out:

$$\epsilon v_1 + OFS_{v1} + OFS_{c1} = \epsilon v_2 + OFS_{v2} + OFS_{c2} \quad (1)$$

In Eq. (1), the terms having the suffixes 1, 2 relate to the first and second control devices (namely the NC and TC devices 101, 102), respectively.

In accordance with the present invention, Eq. (1) is satisfied by altering one of the offset compensation voltages with respect to the voltages $\epsilon v_1$, $\epsilon v_2$ to minimize the movement of the machine tool element when switching between the control devices, and to prevent the accumulation of an error.

Reference will now be made to FIG. 4 to describe the current position sensing method of the invention.

Figure 4A:
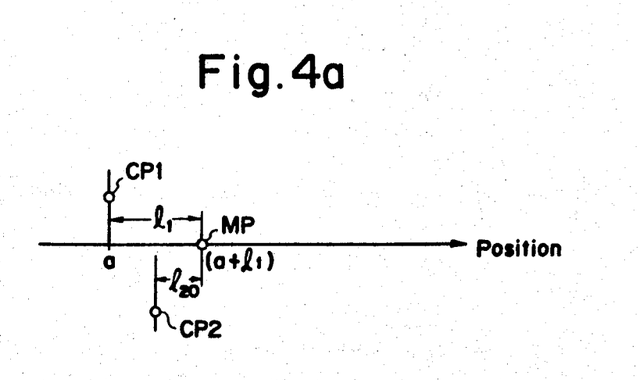
FIGS. 4(A) and 4(B), is useful in describing the method of sensing current position according to the present invention.

We will assume that the initial conditions are such that the NC device 101 is connected to the servo system of the machine tool 103, and that the motor is at rest. We will also assume that the current position $CP_1$ stored in the current position register located in NC device 101 is indicated by a, that the machine element is stopped at the position MP $(a+l_1)$ displaced from a by the steady state deviation $l_1$ and, furthermore, that the data items in the respective error computing and storing units 101e, 102m (FIG. 2) of the NC device 101 and TC device 102 are $-l_1$, $-l_{20}$, respectively. The situation is shown in FIG. 4(A).

Figure 4B:
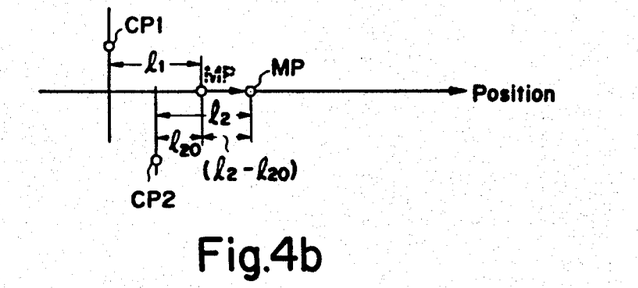

Under the foregoing conditions, the errors $-l_1 (=B)$, $-l_{20}$, which are stored in the error computing and storing units 101e, 102m, respectively, are read out of these units and stored before the machine tool is switched from the NC device 101 to the TC device 102. Next, the machine tool is switched from the NC device 101 to the TC device 102, whereby the machine tool element is shifted toward the stabilization position of the TC device 102, coming to rest at MP as shown in FIG. 4(B). If we denote this amount of movement by $(l_2-l_{20})$ (noting that the condition $l_2=l_{20}$ will hold if there is no change in drift value during control), then the pulse coder 103e will generate $(l_2-l_{20})$-number of feedback pulses Fp and the data stored in the error computing and storing unit 102m of TC device 102 will become $-l_2$. Thereafter, $-(l_2-l_{20})$ is computed using $l_{20}$ stored as described and $l_2$ stored in unit 102m. The result of this operation is converted into a corrective voltage which is then added to the offset compensation voltage $OFS_c$ of the TC device 102. In consequence, the machine tool element is moved in the opposite direction by an amount $(l_2-l_{20})$ and comes to rest at the position $(a+l_1)$, thus restoring the condition shown in FIG. 4(A). The data items stored in the error storing units 101e, 102m at this time are $-l_1$ and $-l_{20}$, respectively. Following these operations, the NC device 101 updates, by means of follow-up control, the data in the current position register thereof on the basis of an arithmetic difference $(A-B)$ obtained by subtracting the stored error B from the error A stored in the error computing and storing unit 101e. The NC device 101 also subtracts $(A-B)$ from the content of the unit 101e. More specifically, the content of the current position register is updated by executing follow-up control in such a manner that the content of unit 101e always becomes $-l_1$. As a result, even when the machine tool element is moved under the control of the TC device 102, the relation between the machine element position and the internally registered current position illustrated in FIG. 4(A) is maintained.

Let us now examine operation when the machine tool is switched from the TC device 102 back to the NC device 101. Prior to the switch, the TC device 102 satisfies Eq. (1), under stable conditions where the machine tool is at rest, owing to the added corrective voltage. As a result, the switch does not bring about any change in the output voltage of the switching circuit 103a, namely the voltage input to the speed control circuit 103b, so that there is no movement of the machine tool element. It should also be noted that the content of the error computing and storing unit 102m of TC device 102 is $-l_{20}$. Thenceforth, the TC device 102 updates, by means of follow-up control, the data in the current position of the machine tool element, stored in the current position register thereof, on the basis of an arithmetic difference $(A'-B')$ obtained by subtracting $-l_{20} (=B')$ from the error $A'$ stored in the error computing and storing unit 102m. The TC device 102 also subtracts $(A'-B')$ from the content of the unit 102m. More specifically, the content of the current position register is updated by executing follow-up control in such a manner that the content of unit 102m always becomes $-l_{20}$.

The foregoing operations are repeated each time the control devices are changed over.

In accordance with the present invention as described above, the machine tool element is shifted only once by switching between the control devices, after which there will be no movement for subsequent switching operations provided that the relation between the two stable points is found.

The following expedient is convenient for dealing with cases where the drift value of a position control circuit changes during the control operation. Specifically, for a change in drift value in the position control circuit of the control device whose loop has been closed, the content of the error computing and storing unit thereof is compared constantly with the value which prevailed immediately before the switching operation and, when a difference is detected, the offset compensation voltage $OFS_c$ corresponding to the difference is changed or a corrective voltage is applied to the mixing circuit, thereby holding the steady state deviation constant at all times.

For a change in drift value in the position control circuit of the control device whose loop is open, on the other hand, the change in drift value is known from the number of feedback pulses applied when the loop was closed. Accordingly, after switching the loop from the open to the closed state to move the machine element by an amount equivalent to the increase or decrease in the drift value, the offset compensation voltage $OFS_c$ is regulated in accordance with the amount of feedback to return the machine element to the former position.

The foregoing deals with a case where there is a change in the drift value. In general, however, the drift value does not undergo a significant change once stabilization has been achieved, so that any change can usually be neglected.

Figure 5:
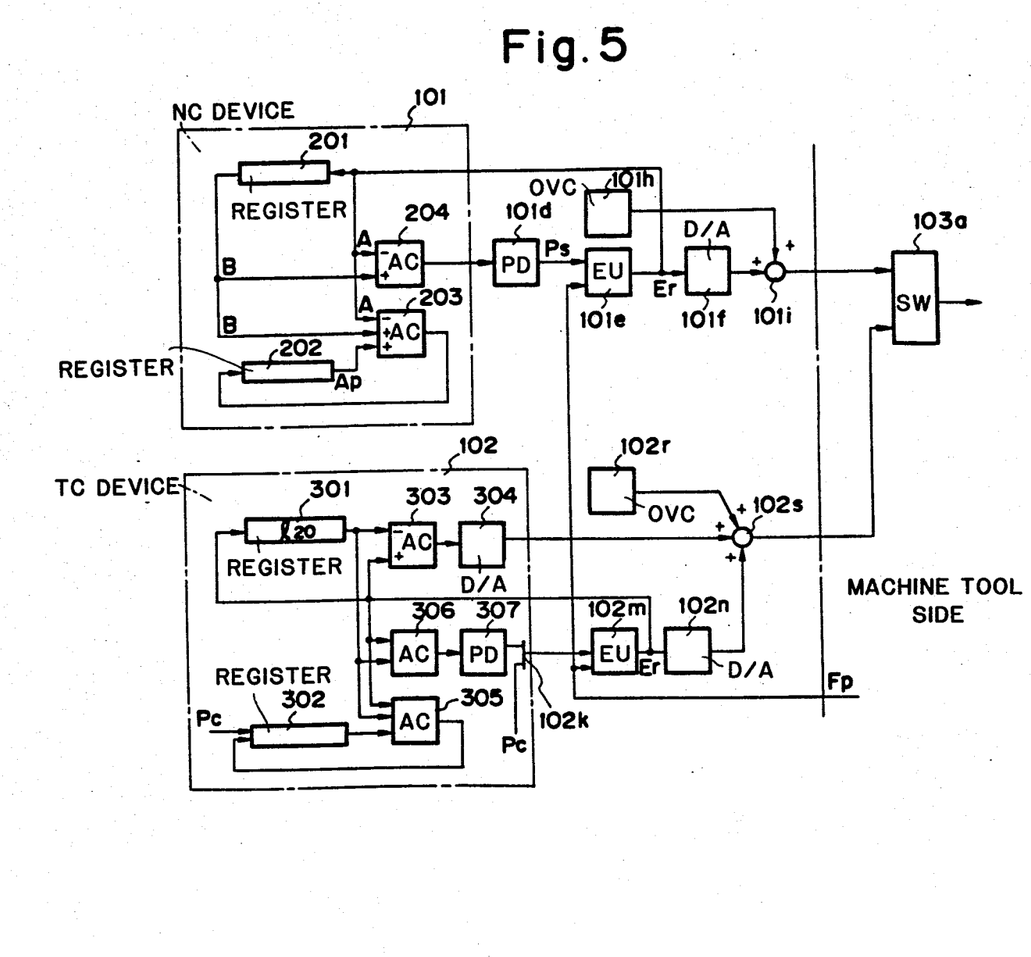
FIG. 5 is a block diagram illustrating an embodiment of an arrangement for practicing the sensing method of the present invention.

FIG. 5 is a block diagram of follow-up control circuits located in the control units of the NC device and TC device. The follow-up control circuit of the NC device 101 includes a steady deviation register 201 which, when the machine tool is switched over from the NC device 101 to the TC device 102, stores the content $-l_1$ ($=B$) of the error computing and storing unit 101e immediately before the switch is made. Numeral 202 denotes a current position register for storing the current position AP. Numeral 203 denotes a follow-up arithmetic circuit whose inputs are the content B of the steady deviation register 201, the old current position AP stored in the current position register 202, and the content A of the error computing and storing unit 101e. On the basis of these inputs, the arithmetic circuit 203 performs the operation given by the following expression:

$$AP-(A-B) \rightarrow AP \quad (2)$$

to update the current position. Numeral 204 denotes an arithmetic circuit for performing the operation:

$$-(A-B)=D \quad (3)$$

and for applying the result to the pulse distributor 101d.

When the machine tool is switched over from the NC device 101 to the TC device 102, the content of the error computing and storing unit 101e, namely the steady deviation B, is preset in register 201. Next, the follow-up arithmetic circuit 203 performs the operation given by expression (2) above, and the arithmetic circuit 204 performs the operation given by expression (3). Since $A=-B$ ($D=0$) in a case where the machine element has not yet been moved under the control of the TC device 102, no updating of the current position AP takes place and the pulse distributor 101d does not generate the distributed pulses $P_s$, so that the content of error computing and storing unit 101e is equivalent to B. On the other hand, when the machine element is moved under the control of the TC device and $m_1$-number of feedback pulses Fp are generated, the content A of the error computing and storing unit 101e becomes $-(B+m_1)$. As a result, the content of the current position register 202 is updated to $(AP+m_1)$ in accordance with the foregoing arithmetic operations (2) and (3), and the pulse distributor 101d is issued a command equivalent to $-(A-B)$ ($=m_1$). When this occurs, the pulse distributor 101d immediately begins the pulse distribution operation for the production of the distributed pulses $P_s$. These pulses are applied to the error computing and storing unit 101e, whereby the content thereof is incremented by one step in the positive (forward) direction whenever a distributed pulse $P_s$ is generated. At the instant $m_1$-number of distributed pulses $P_s$ are generated, the pulse distribution end signal is produced and the pulse distribution operation ends, at which time the content of the error computing and storing unit 101e is $-B$.

In a case where the machine element continues to be moved under the control of the TC device 102, the feedback pulses Fp are applied to the error computing and storing unit 101e while the pulse distribution operation based on $m_1$ is being executed. The feedback pulses update the unit 101e in the negative (reverse) direction as each one is generated. Accordingly, if we assume that the time at which the content $-(B+m_1)$ is read out of unit 101e is $t_1$, that the time at which the $m_1$-number of distributed pulses are generated is $t_2$, and that $m_2$-number of feedback pulses Fp are generated between times $t_1$ and $t_2$, then the content of error computing and storing unit 101e at time $t_2$ will be $-(B+m_2)$. Now, if the arithmetic operations (2) and (3) are performed when the pulse distribution end signal is generated, the content of the current position register 202 is updated to $(AP+m_1+m_2)$, and a command equivalent to $m_2$ is applied to the pulse distributor 101d. Thereafter, by exercising control in a similar manner, the content of the current position register 202 will be updated correctly to $AP+\Sigma m_i$, and the content of error computing and storing unit 101e will be $-B$, when the machine element comes to rest upon completion of the control operation performed by the TC device 102. Therefore, when the position control loop of the NC device 101 is later switched from the open to the closed state, the steady deviation $-B$ will already be stored in the unit 101e, so that the change in the status of the loop will not be accompanied by movement of the machine element.

The follow-up control circuit of the TC device 102 includes a steady deviation register 301 which, when the machine tool is switched over from the NC device 101 to the TC device 102, stores the content $-l_{20}$ ($=B'$) of the error computing and storing unit 102m immediately before the switch. Also included is a current position register 302 for storing the current position AP of the machine tool element, a first arithmetic circuit 303, and a DA converter 304. Immediately after the changeover from the NC device 101 to the TC device 102, the machine tool element is moved a distance $(l_2-l_{20})$ toward the stable position because of the drift which develops in the closed loop formed by the TC device 102, as decribed hereinabove with reference to FIG. 4.

As a result, ($l_2-l_{20}$)-number of feedback pulses Fp are generated and the content of the error computing and storing unit 102m becomes $-l_2$. Thenceforth the first arithmetic circuit 303 performs the operation $-(l_2-l_{20})$ and the DA converter 304 converts the result into an analog quantity which is then applied to the mixing circuit 102s. The machine tool element consequently is moved a distance ($l_2-l_{20}$) in the direction opposite to that just mentioned, and the content of the error computing and storing unit 102m becomes $l_{20}$. Numeral 305 denotes a follow-up arithmetic circuit, 306 a second arithmetic circuit and 307 a pulse distributor. These function in the same manner as the follow-up arithmetic circuit 203, arithmetic circuit 204 and pulse distributor 101d, respectively, of the NC device 101 to exercise the arithmetic operations for follow-up control.

In operation, when the machine tool is switched over from the NC device 101 to the TC device 102, the content $-l_{20}$ of the error computing and storing unit 102m immediately prior to the switch is stored in the steady deviation register 301. After the switch, the machine tool element is moved a distance ($l_2-l_{20}$) in the manner described above. However, since the DA converter 304 generates a voltage which will cause the machine tool element to return to the position occupied prior to the switch, the tool element is restored to this position. Following the completion of this operation, the machine tool element is transported under the control of the TC device 102 and the position thereof is stored at all times by the current position register 302 which counts the command pulses $P_c$ reversibly in accordance with the direction of movement. It should be noted that when the machine tool element is being transported under the control of the NC device 101, the follow-up arithmetic circuit 305, second arithmetic circuit 306 and pulse distributor 307 of the TC device 102 execute follow-up control processing in the same manner as described above with respect to the NC device, thereby updating the content of the current position register 302 and maintaining the content of the error computing and storing unit 102m at $-l_{20}$.

In accordance with the present invention as described and illustrated hereinabove, no error accumulates when the machine tool element is shifted by switching among different control devices for selectively driving a single servomotor, even if the closed loop formed by connecting one of the control devices to the machine tool incorporates a drift of a magnitude different from the other control devices. In addition, switching among the control devices does not cause any error in the current position registered within them. As a result, there is no shift in the current position indication, allowing the machine tool element to be controlled with great accuracy.

As many apparently widely different embodiments of the present invention can be made without departing from the spirit and scope thereof, it is to be understood that the invention is not limited to the specific embodiments thereof except as defined in the appended claims.

What we claim is:

1. A method of sensing a current position in a position control system of the type including first and second control devices, each having at least means for generating command pulses, error storage means for computing and storing an error between the number of command pulses and feedback pulses each of which is generated whenever a motor rotates by a predetermined amount and a current position register, a speed control circuit for driving and controlling the motor on the basis of the error stored in each of said error storage means and a switching circuit for connecting said first and second control devices to the speed control circuit, which method is for updating the data in the current position register of whichever of the first and second control devices is not connected to said speed control circuit, and for enabling the unconnected control device to sense the current position of a movable element driven by the motor under the control of the connected control device, said method comprising steps of:
   (a) storing the errors which are stored in the error storage means of said first and second control devices immediately before the connection to said speed control circuit is switched from said first control device to said second control device by said switching circuit;
   (b) computing an arithmetic difference by subtracting the error in the error storage means of said second control device, which error was stored in step (a), from the error stored in the error storage means of said second control device after the switching operation when the movable element has stabilized prior to being controlled by said second control device;
   (c) returning the movable element to the position which prevailed prior to the switching operation by supplying said speed control circuit with an offset voltage corresponding to the computed arithmetic difference;
   (d) updating the data in the current position register of said first control device, while said motor is under the control of said second control device, on the basis of an arithmetic difference found by reading the data in the error storage means of said first control device which is counting the feedback pulses, and subtracting the error in the error storage means of said first control device, which error was stored in step (a), from the read data; and
   (e) revising the data in the error storage means of said first control device on the basis of the arithmetic difference found in step (c).

2. A method according to claim 1, wherein which step (e) includes substracting said arithmetic difference from the data in said error storage means.

3. A method according to claim 1, further including the step (f) of updating the data in the current position register of said second control device while said second control device is disconnected from, and said first control device is connected to, said speed control circuit by said switching circuit, said updating step comprising the steps of:
   (fi) updating the data in the current position register of said second control device on the basis of an arithmetic difference found by subtracting the error in the error storage means of said second control device, which error was stored in step (a), from the error in the error storage means of said second control device; and
   (fii) updating the data in said error storage means on the basis of said arithmetic difference.

4. A method according to claim 1, further including the step of repeating step (d) each time step (e) is executed.

5. An apparatus for sensing a current position in a position control system of the type including first and second control devices, each having at least means for generating command pulses, error storage means for computing and storing an error between the number of command pulses and feedback pulses each of which is generated whenever a motor rotates by a predetermined amount and a current position register, a speed control circuit for driving and controlling the motor on the basis of the error stored in each of said error storage means and a switching circuit for connecting said first and second control devices to the speed control circuit, which apparatus updates the data in the current position register of which ever of the first and second control devices is not connected to said speed control circuit and enables the unconnected control device to sense the current position of a movable element driven by the motor under the control of the connected control device, said apparatus comprising:

- a second register, provided in said second control device and operatively connected to the error storage means therein, for storing the error which is stored in the error storage means of said second control device immediately before the connection to said speed control circuit is switched from said first control device to said second control device by said switching circuit;
- an arithmetic circuit, provided in said second control device and operatively connected to the error storage means and said second register therein, for computing an arithmetic difference by subtracting the error stored in said second register from the error stored in the error storage means of said second control device after the switching operation when the movable element has stabilized prior to being controlled by said second control device;
- means, provided in said second control device, for returning the movable element to the position which prevailed prior to the switching operation by supplying said speed control circuit with an offset voltage corresponding to the computed arithmetic difference;
- a first register, provided in said first control device and operatively connected to the error storage means therein, for storing the error stored in the error storage means of said first control device immediately before the switching operation;
- first updating means, provided in said first control device and operatively connected to said first register, the error storage means and the current position register therein, for updating the data in the current position register of said first control device, while said motor is under the control of said second control device, on the basis of an arithmetic difference found by subtracting the error in said first register from the error in the error storage means of said first control device; and
- first means, provided in said first control device and operatively connected to said first register and the error storage means therein, for revising the data in the error storage means of said first control device on the basis of said arithmetic difference.

6. An apparatus according to claim 5, wherein said second control device includes second updating means, operatively connected to the said second register, the error storage means and the current position register, for updating the data in the current position register of said second control device while said first control device is connected to said speed control circuit in place of said second control device and said motor is under the control of said first control device, and wherein said second updating means includes:

- arithmetic means, operatively connected to said second register, the current position register and the error storage means of said second control device, for updating the data in the current position register of said second control device on the basis of an arithmetic difference found by subtracting the error in said second register from the error in the error storage means of said second control device; and
- second means, operatively connected to said second register and the error storage means of said second control device, for revising the data in the error storage means of said second control device on the basis of said arithmetic difference.

* * * * *

UNITED STATES PATENT AND TRADEMARK OFFICE
CERTIFICATE OF CORRECTION

PATENT NO. : 4,485,338
DATED : November 27, 1984
INVENTOR(S) : HITOSHI MATSUURA ET AL It is certified that error appears in the above-identified patent and that said Letters Patent is hereby corrected as shown below:

In the Abstract, line 4, "means" should be --device--;
line 5, "means" should be --device--;
line 10, "means" should be --device--;
line 12, ", the" should be --. The--;
line 16, after "cludes", insert --the--
line 24, "means" should be --device--;
line 25, "means" should be --device--;
line 30, "means" should be --device--;
line 31, "means" should be --device--;
line 32, after "motor", insert --is--.

Column 4, line 14, delete "so as".

Column 5, line 58, after "also", insert --changes--.

Column 7, line 12, after "the", insert --latter--.

Column 9, line 59, no new paragraph.

Signed and Sealed this

Twenty-eighth Day of May 1985

[SEAL]

Attest:

DONALD J. QUIGG

Attesting Officer *Acting Commissioner of Patents and Trademarks*